H. A. SCHEUERLE.
MECHANISM FOR MAKING BIFOCAL LENSES.
APPLICATION FILED APR. 17, 1914.
1,140,401.
Patented May 25, 1915.
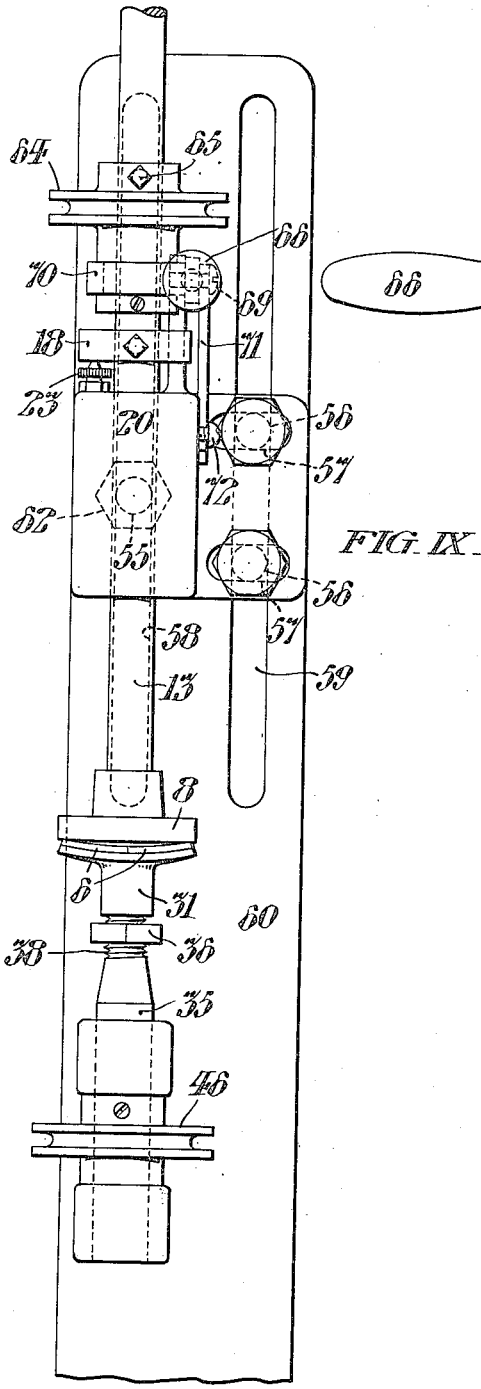
FIG. IX.
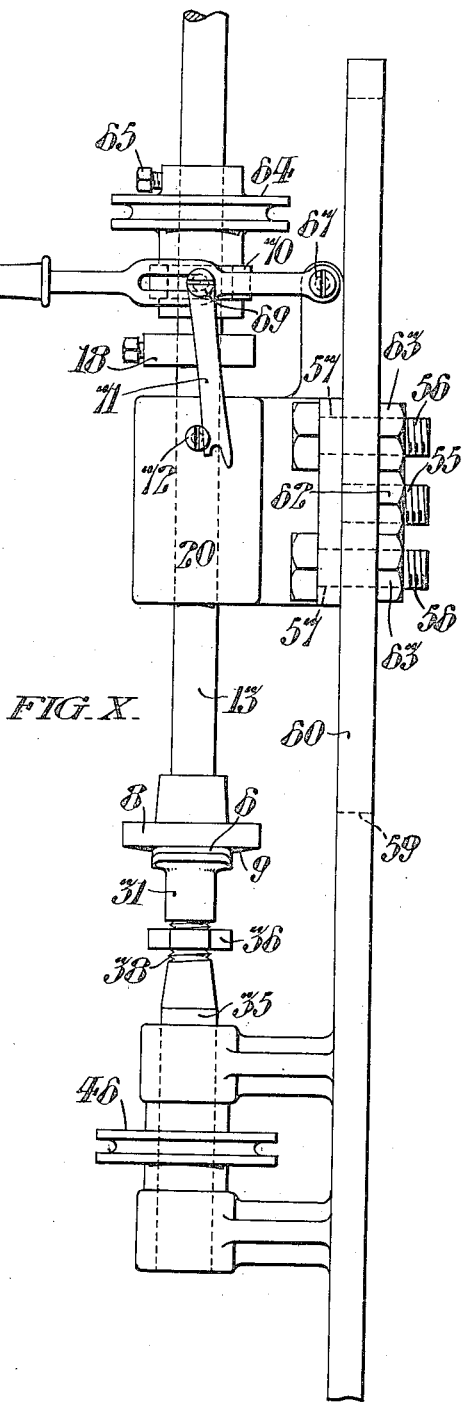
FIG. X.
WITNESSES:
Philip W. Vessey
Joseph E. Degal
INVENTOR:
Henry A. Scheuerle
by Arthur E. Paige
Attorney

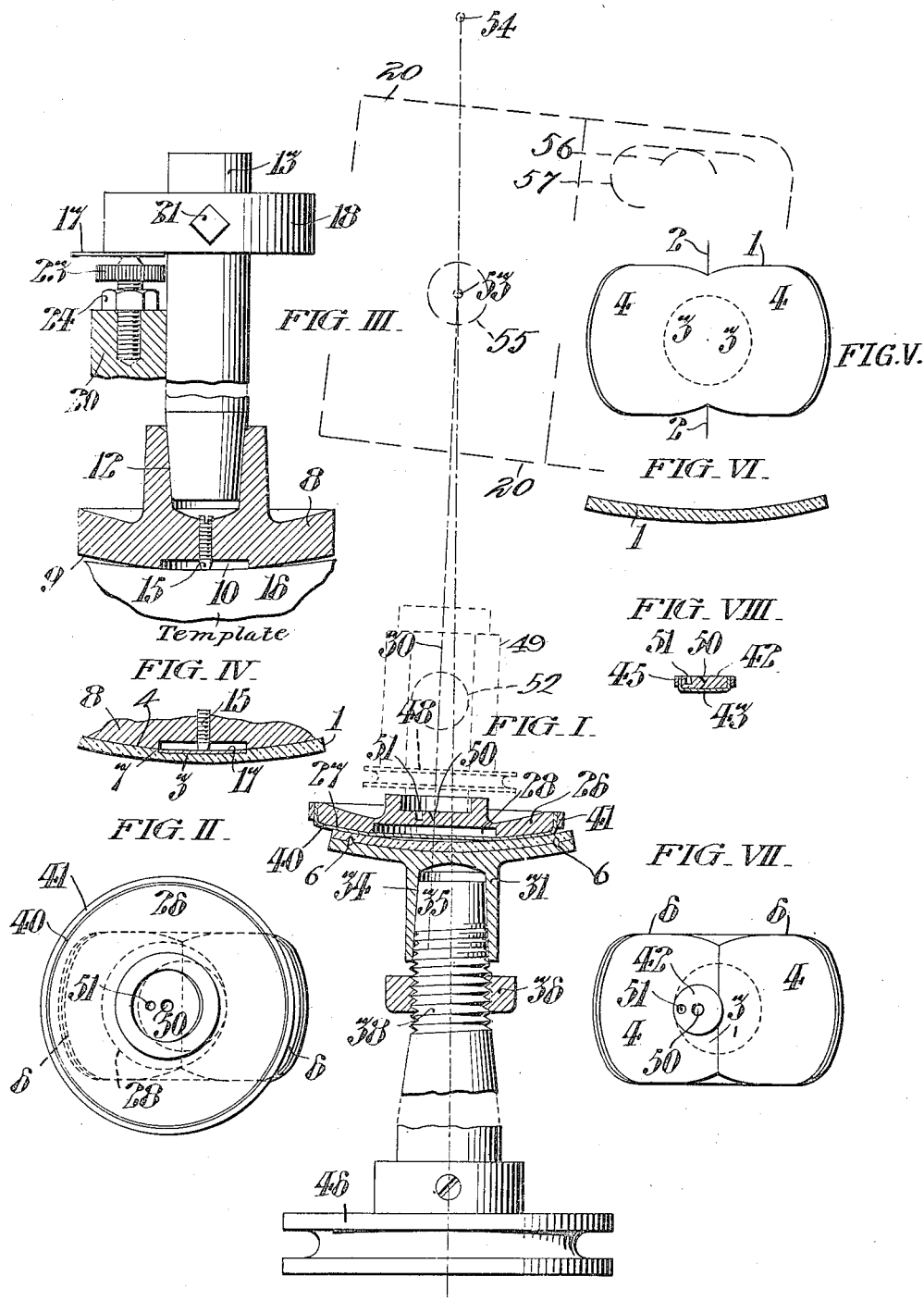

UNITED STATES PATENT OFFICE.

HENRY A. SCHEUERLE, OF PHILADELPHIA, PENNSYLVANIA.

MECHANISM FOR MAKING BIFOCAL LENSES.

1,140,401. Specification of Letters Patent. Patented May 25, 1915.

Original application filed March 18, 1914, Serial No. 825,604. Divided and this application filed April 17, 1914. Serial No. 832,439.

*To all whom it may concern:*

Be it known that I, HENRY A. SCHEUERLE, a citizen of the United States, residing at Philadelphia, in the State of Pennsylvania, have invented a certain new and useful Improvement in Mechanism for Making Bifocal Lenses, whereof the following is a specification, reference being had to the accompanying drawing.

This application is a division of my application Serial No. 825,604, filed March 18, 1914, wherein the claims are limited to the method of making bifocal lenses herein contemplated.

My invention relates to mechanism for abrading one side of glass, for two lenses at a time, to form, at different times, major areas for distant vision and minor areas for near vision, regardless of the opposite side of said glass, which may be shaped by any convenient method or means.

In ordinary mechanism for producing such major and minor areas, the axis of rotation of the glass and the axis of rotation of the abrading element have a relative movement, during the abrading operation, which is oscillatory, gyratory, planetary or the resultant of freedom for one or more such movements; the purpose and effect of such freedom being to permit the abrading means to follow the initial curvature of the glass blank so as to minimize the extent of the abrading operation with respect thereto; but such freedom permits the abrading means to follow inaccuracies in the glass blanks instead of eliminating them.

In accordance with my invention, the laps positively determine the final curvature of all of the lens areas, by the maintenance of their axes of rotation in unvarying relation with the axis of rotation of the glass, throughout each abrading operation. Glass for two such lenses, to have respective minor areas adjoining each other and between their respective major areas, is circularly abraded at the same time and by the same lap, while rotating with said minor areas having a common center of curvature upon the axis of rotation of the glass, and said major areas having a common center of curvature upon said axis. However, said major areas are not abraded at the same time as said minor areas.

Although, in accordance with my invention, the lens blank or blanks and the abrading means are relatively rotated upon a common axis during the abrasion of the minor lens areas; which axis extends through centers of curvature of all of the lens areas, both major and minor; the principal effect of my invention is to circularly abrade the major area of what is ultimately a plurality of lenses, while preventing abrasion of the minor area of what is ultimately said plurality of lenses; the lens blank or blanks and the abrading means being relatively rotated upon axes respectively coinciding with different radii of curvature, but both common to all of the major lens areas.

My invention includes a lap having an annular convex abrading surface, for operating upon the major areas for two lenses simultaneously, having a central recess encircling the minor areas for both lenses, so as to prevent abrasion thereof during the abrasion of the major areas. Although the movement of said lap is limited to rotation concentric with a stationary axis, (with such axial advance toward the glass as to abrade the latter,) said axis of rotation of the lap is eccentric to the axis of rotation of the glass, and both of said axes coincide with respective radii of curvature of said major areas, so that, finally, a spherical surface is generated throughout said areas, without concentric rotation of the glass and abrading elements, and consequently without the production of any circular ruts or scratches in the glass, although the glass is circularly abraded and throughout a circular zone concentric with the axis of rotation of the glass. I use the terms "circularly abrading" and "circularly abraded" to distinguish the operation of my invention from the aforesaid oscillatory, gyratory and planetary abrading operations characteristic of the prior art.

Another object of my invention is to variably limit the axial movement of said lap toward the glass to precisely predetermine the axial extent of its abrading action upon the major areas. Therefore, I provide said annular lap with an axially adjustable member, carried in its central recess, which is set with reference to the curvature of the minor areas, and coöperates with a normally stationary but adjustable stop device, supported independently of said lap; and provide a gage element to determine the coöperative relation of said lap member and stop.

My invention includes the various novel features of construction and arrangement hereinafter more definitely specified.

In the drawing: Figure I is a fragmentary sectional view of a relatively rotary lens blank holder and annular lap of the general character above contemplated. Fig. II is a plan view of certain of the elements shown in Fig. I, showing their relatively eccentric relation. Fig. III is a vertical sectional view of a rotary lap, carrying means for variably limiting the abrading action thereof, illustrating the method of adjusting such limiting means with respect to a templet of the curvature of the minor lens areas. Fig. IV is a fragmentary sectional view of the lap and limiting means shown in Fig. III, illustrating the method of adjusting such limiting means with respect to a lens which is to be abraded by said lap, to the extent limited by such adjustment. Fig. V is a plan view of a single blank, adapted to be severed to form two oppositely counterpart bifocal lenses. Fig. VI is a longitudinal sectional view of the lens blank shown in Fig. V. Fig. VII is a plan view illustrating arrangement of the mechanism for abrading the minor lens areas by relative rotation of the abrading tool and lens blank upon axes respectively coinciding with different radii of curvature, but common to all, of the minor lens areas. Fig. VIII is a sectional view of the abrading tool shown in Fig. VII. Fig. IX is a front elevation of a convenient form of mechanism for effecting relative rotation of the lens blank holder and laps in variable angular relation, as indicated in Fig. I, but set with the axes of rotation in alinement. Fig. X is a side elevation of the mechanism shown in Fig. IX.

In said figures; the glass which is ultimately to form two similar bifocal lenses may be a single blank 1, as shown in Fig. IV, which when the abrasion thereof is completed is divided on the line 2—2 to form two oppositely counterpart bifocal lenses each having a minor area 3 and a major area 4, or, the glass which is ultimately to form the two bifocal lenses may be primarily separate blanks 6, 6 disposed in oppositely counterpart relation as shown in Fig. VII. In either case, the axially opposite surfaces of the blank 1, or blanks 6, 6, are, initially, spherical surfaces throughout their extent, having a common center of curvature. Moreover, the respective minor areas have a common center of curvature, on the line 32 which is the radial axis of rotation of said blank or blanks, and the major areas also have a common center of curvature on said radial axis; so that said line 32 shown in Fig. I, which is the axis of rotation of the holder 31, extends through centers of curvature of all of the lens areas, both major and minor, throughout the abrading operation herein contemplated. Said abrading operation includes what is termed rough grinding, fine grinding, extra fine grinding, and polishing all of said major and minor areas, and such abrasion is preferably performed in the following order, although I do not wish to limit my invention to such order of operation, to wit; with the glass and abrading elements relatively rotating concentrically, upon a common axis, the minor area or areas 3 circumscribed by the dotted lines in Figs. V and VII, are first rough ground and then fine ground. Then, with the glass and abrading elements relatively rotating concentrically, upon a common axis, the major area or areas 4 are rough ground and fine ground. Then, with the glass and abrading elements relatively rotating upon relatively eccentric axes, but with said axes respectively coinciding with different radii of curvature of said areas 4, said areas are extra fine ground and then polished. Then, with said glass and abrading elements relatively rotating, upon said relatively eccentric axes, said minor areas 3 are extra fine ground, and then polished.

It is to be particularly noted that when said glass and abrading elements are relatively rotated, upon said relatively eccentric axes, in accordance with my invention, said axes are maintained relatively stationary throughout the operation. In other words, my invention avoids all of the planetary, oscillatory and gyratory movements of the axes of rotation of the glass and abrading elements which are characteristic of the prior art.

Of course it would be more convenient and expeditious to effect all abrasion of the glass wholly by concentric relative rotation of the glass and abrading elements, but such abrasion forms circular scratches or ruts in the abraded surface, due to irregularities in the form or distribution of the abrading material, and therefore, for the finer abrasion, it is preferable to rotate the glass and abrading elements eccentrically to each other, in accordance with my method, and thus prevent the formation of such circular irregularities, by thus causing continual change in the relation of the abrading and abraded surfaces during their relative rotation.

The glass blanks 1 and 6 are primarily molded or dropped, as nearly as possible, throughout their entire area, to the curvature finally intended for the major area or areas 4, and said minor areas 3 may be rough and fine ground by suitable laps of ordinary construction, such abrasion of course forming a shoulder, such as indicated at 7 in Fig. IV, where the area 3 is offset from the area 4. I prefer to employ for rough and fine grinding the major areas 4, the lap 8 shown in Fig. III having the annular convex abrading surface 9 with the central recess 10, said recess being coextensive with said minor areas 3 so as to avoid abrading the latter, while abrading both the major areas 4 by the annular lap surface 9 or material carried thereby. Said lap 8, which has the conical socket 12 to frictionally engage the conical mandrel 13 by which it is rotated, carries means arranged to variably limit the axial extent of the abrading action of said annular surface 9 with respect to said blank or blanks, including the screw 15 which is adjusted axially in said lap to contact with the templet 16 which may be any suitable element having the curvature of the minor area 3. For instance, said templet may have a four dioptric curvature and said lap surface 9 have a six dioptric curvature. Then I set in the recessed area 3 of the lens blank a gage plate 17 of any thickness sufficient to permit said lap 8 to clear said shoulder 7 when said screw 15 bears upon said plate 17 as shown in Fig. IV; and interpose the same thickness of gage plate between the collar 18 on said mandrel 13 and a suitable stop, conveniently on the frame bearing 20 through which said mandrel is movable toward and away from the lens. Said collar 18 may be adjustable on said mandrel by the set screw 21, but I prefer to provide adjusting means which may be more accurately set, including the screw stud 23 engaging said bearing 20 and which may be locked in adjusted position by the nut 24. After such adjustment, the gage plates 17 being removed both from the lens and from the said stud, 23; the latter stops the downward abrading movement of the mandrel 13 precisely when the lap 8 reaches the position with respect to the lens that it occupied with respect to the templet, thus eliminating any shoulder at the junction of said areas 3 and 4. In order to prevent scratching the area 3 with said screw 15; the latter may be raised from its set position, shown in Fig. III, before abrading the lens with the lap 8.

As aforesaid, said lap 8 may be conveniently employed for the rough and fine grinding operation, but for the extra fine grinding operation I prefer to employ the lap 26 shown in Fig. I having the convex annular abrading surface 27 surrounding the central circular recess 28; said lap 26 being rotated relatively to the lens blanks 6 upon an axis 30 which extends through the center of the curvature common to the major areas 4 of both of said blanks which are conveniently held in the opposite counterpart relation shown in Fig. VII, in the holder 31 which is preferably rotated, during the abrading operation, upon the axis 32 which extends through the centers of the curvatures of all of said areas 3 and 4 but coincides with radii different from said axis of rotation 30 of the abrading surface 27. Both of said axes 30 and 32 remain stationary throughout the abrading operations aforesaid. Said holder 31 is conveniently provided with the conical socket 34 to frictionally engage the conical mandrel 35 from which it may be forcibly removed by rotation of the nut 36 (which engages the screw thread 38 on said mandrel 35) when it is desired to substitute another holder, of different curvature, in connection with said mandrel. Said band wheel 48 may be conveniently journaled in the bearing 49 which is angularly adjustable on the pivot 52 to direct the axes of rotation of said laps 26 and 42 through different centers of curvature, as 53 and 54.

In said fine grinding operation said abrading surface 27 of the lap 26 is uncovered, the only substance between said abrading surface and the glass surface being the comminuted abrading material. However, when it is desired to polish with said lap 26, its surface 27 is covered, conveniently by the silk textile fabric 40 which is held thereon by the ring 41, and said fabric carries the polishing material.

The surface to be abraded being rotated with the minor area or areas 3, at the axial region thereof, and the major area or areas 4 at the distal region thereof; it is to be noted that said circular recess 28 in said lap 26, being concentric with its axis of rotation 30, is presented over the entire minor area 3, eccentrically to the axis of rotation of said area 3, so that the latter is not abraded by said lap 26 while the latter is employed to abrade the major area or areas 4, in an annulus encircling the axis 32 of rotation of the glass, but eccentric to that axis. Said minor area 3 may be conveniently polished by the lap 42; shown in Fig. VIII covered by the textile fabric 43 held thereon by the ring 45. Said lap 42 is also rotated eccentrically to the glass, on an axis which is eccentric to the axis 32 of rotation of the glass, so as to avoid making circular scratches therein. The rotary movement of said lens blank 1 or blanks 6 may be conveniently effected by providing said mandrel 35 with the band wheel 46. Said laps 26 and 42 may be conveniently rotated by engagement with the band wheel 48 having central and eccentric studs engaging corresponding seats 50 and 51 in said laps.

It may be observed that the axes of said eccentrically rotary laps 26 and 42 are in respectively different angular relation with the axis 32 of rotation of the lens holder 31, and it is to be noted that the relation of said axes may not only be varied angularly, but that the centers of oscillation of said axes may be shifted toward or away from the abrading surface in accordance with the curvature of such surface. For instance, the center 53, with respect to which the axis 30 of the lap 26 is adjusted to vary the angular relation of said axis with respect to the axis of the surface 4 of the lens blank to be abraded, is also adjusted to coincide with the center of the six dioptric curvature of the latter surface; and the center 54, with respect to which the axis of the lap 42 is adjusted to vary the angular relation of said axis with respect to the axis 32 of the surface 3 of the lens, is also adjusted to coincide with the center of the four dioptric curvature of said area 3. Such adjustments may be effected by any convenient means. For instance, said bearing 20 may have bolts 55 and 56 fitted in respective slots 58 and 59 extending parallel with said axis 32 in a supporting frame 60, and having nuts 62 and 63 to secure said bearing in adjusted position. In such construction and arrangement the bolt 55 serves as a pivot upon which the bearing 20 may be angularly adjusted, said bolts 56 being fitted through slots 57 in said bearing, extending transversely to the slot 59 in said frame, to permit such adjustment.

As shown in Figs. IX and X, the mandrel 13 is provided with the band wheel 64, adjustably secured thereon by the set screw 65, by which it may be conveniently rotated. Said mandrel, and the appurtenances thereof, may be raised and lowered by the handle 66 which is conveniently fulcrumed at 67 on said bearing 20, and engaged with the stud 69 on the collar 70 in which the hub of said wheel 64 turns. As said mandrel 13 tends to gravitate to present said collar 18 in contact with the adjustable screw stud 23, I find it convenient to provide means by which it may be upheld in idle position, including the strut 71 which is pivoted on said stud 69 and may be set upon the stud 72 projecting from said bearing 20.

I do not desire to limit myself to the precise details of construction and arrangement herein set forth, as it is obvious that various modifications may be made therein without departing from the essential features of my invention as defined in the appended claims.

I claim:—

1. In mechanism for making bifocal lenses, the combination with means for holding a pair of lens blanks with their respective minor areas adjoining each other and between their respective major areas; of means arranged to rotate said blanks, together, upon an axis extending through centers of curvature of all the major and minor areas of both blanks; means common to both blanks arranged to abrade them at their major areas, while preventing abrasion of their minor areas, including a rotary lap having an annular convex abrading surface, with a central recess coextensive with said minor areas; means arranged to contemporaneously rotate said lap upon an axis extending through the center of curvature common to the major areas of both blanks, but different from the axis of rotation of said blanks; means arranged to prevent any change in the direction of said axes during the abrading operation; means arranged to variably determine the angular relation of the respective axes of rotation of said blanks and lap, including an axial bearing for said lap, which is adjustable both longitudinally and angularly with respect to the axis of rotation of said blanks, and means arranged to secure said bearing in adjusted position; means arranged to variably limit the axial extent of the abrading action of said lap on the major areas of said blanks, in definite relation to the extent of the minor areas thereof, including an axially adjustable screw threaded member, carried by said lap, arranged to be set in accordance with the curvature of said minor areas; a normally stationary but adjustable stop device, supported independently of said lap, and a gage element whereby the coöperative relation of said screw threaded member and adjustable stop is predetermined; whereby the major areas on both of said blanks are circularly abraded at the same time and by the same lap, without concentric rotation of the glass and abrading elements, although the glass is thus circularly abraded throughout a circular zone concentric with the axis of rotation of the glass and including all of said major areas.

2. In mechanism for making bifocal lenses, the combination with means for holding a pair of lens blanks with their respective minor areas adjoining each other and between their respective major areas; of means arranged to rotate said blanks, together, upon an axis extending through centers of curvature of all the major and minor areas of both blanks; means common to both blanks arranged to abrade them at their major areas, while preventing abrasion of their minor areas, including a rotary lap having an annular convex abrading surface, with a central recess coextensive with said minor areas; means arranged to contemporaneously rotate said lap upon an axis extending through the center of curvature common to the major areas of both blanks, but different from the axis of rotation of said blanks; means arranged to prevent any change in the direction of said axes during the abrading operation; means arranged to variably determine the angular relation of the respective axes of rotation of said blanks and lap, including an axial bearing for said lap, which is adjustable both longitudinally and angularly with respect to the axis of rotation of said blanks, and means arranged to secure said bearing in adjusted position; and means arranged to variably limit the axial extent of the abrading action of said lap on the major areas of said blanks, in definite relation to the extent of the minor areas thereof, including an axially adjustable screw threaded member, carried by said lap, arranged to be set in accordance with the curvature of said minor areas.

3. In mechanism for making bifocal lenses, the combination with means for holding a pair of lens blanks with their respective minor areas adjoining each other and between their respective major areas; of means arranged to rotate said blanks, together, upon an axis extending through centers of curvature of all the major and minor areas of both blanks; means common to both blanks arranged to abrade them at their major areas, while preventing abrasion of their minor areas, including a rotary lap having an annular convex abrading surface, with a central recess coextensive with said minor areas; means arranged to contemporaneously rotate said lap upon an axis extending through the center of curvature common to the major areas of both blanks, but different from the axis of rotation of said blanks; means arranged to prevent any change in the direction of said axes during the abrading operation; means arranged to variably determine the angular relation of the respective axes of rotation of said blanks and lap, including an axial bearing for said lap, which is adjustable both longitudinally and angularly with respect to the axis of rotation of said blanks; means arranged to secure said bearing in adjusted position; and means arranged to variably limit the axial extent of the abrading action of the side lap on the major areas of said blanks, in definite relation to the extent of the minor areas thereof.

4. In mechanism for making bifocal lenses, the combination with means for holding a pair of lens blanks with their respective minor areas adjoining each other and between their respective major areas; of means arranged to rotate said blanks, together, upon an axis extending through centers of curvature of all the major and minor areas of both blanks; means common to both blanks arranged to abrade them at their major areas, while preventing abrasion of their minor areas, including a rotary lap having an annular convex abrading surface, with a central recess coextensive with said minor areas; means arranged to contemporaneously rotate said lap upon an axis extending through the center of curvature common to the major areas of both blanks, but different from the axis of rotation of said blanks; means arranged to prevent any change in the direction of said axes during the abrading operation; means arranged to variably determine the angular relation of the respective axes of rotation of said blanks and lap, including an axial bearing for said lap, which is adjustable both longitudinally and angularly with respect to the axis of rotation of said blanks; and means arranged to secure said bearing in adjusted position.

5. In mechanism for making bifocal lenses, the combination with means for holding a pair of lens blanks with their respective minor areas adjoining each other and between their respective major areas; of means arranged to rotate said blanks, together, upon an axis extending through the centers of curvature of all the major and minor areas of both blanks; means common to both blanks arranged to abrade them at their major areas, while preventing abrasion of their minor areas, including a rotary lap having an annular convex abrading surface, with a central recess coextensive with said minor areas; means arranged to contemporaneously rotate said lap upon an axis extending through the center of curvature of the major areas of both blanks, but different from the axis of rotation of said blanks; means arranged to prevent any change in the direction of said axes during the abrading operation; and means arranged to variably determine the angular relation of the respective axes of rotation of said blanks and lap.

6. In mechanism for making bifocal lenses, the combination with means for holding a pair of lens blanks with their respective minor areas adjoining each other and between their respective major areas; of means arranged to rotate said blanks, together, upon an axis extending through centers of curvature of all the major and minor areas of both blanks; means common to both blanks arranged to abrade them at their major areas, while preventing abrasion of their minor areas, including a rotary lap having an annular convex abrading surface, with a central recess coextensive with said minor areas; means arranged to contemporaneously rotate said lap upon an axis extending through the center of curvature of the major areas of both blanks, but different from the axis of rotation of said blanks; and means arranged to prevent any change in the direction of said axes during the abrading operation.

7. In mechanism for making bifocal lenses, the combination with means for holding a pair of lens blanks with their respective minor areas adjoining each other and between their respective major areas; of means arranged to rotate said blanks, together, upon an axis extending through the center of curvature of both blanks; means common to both blanks arranged to abrade them at their major areas, while preventing abrasion of their minor areas, including a rotary lap having an annular convex abrading surface, with a central recess coextensive with said minor areas; means arranged to contemporaneously rotate said lap upon an axis extending through the center of curvature of the major areas of both blanks, but different from the axis of rotation of said blanks; and means arranged to prevent any change in the direction of said axes during the abrading operation.

8. In mechanism for simultaneously abrading a plurality of bifocal lenses, the combination with abrading means including a rotary lap common to the major areas of said lenses, and having an annular abrading surface with a recess; said recess registering with the minor areas of said lenses, so as not to abrade the latter; of means arranged to rotate said lap; means supporting each of said lenses for rotation upon an axis radial with respect to the center of curvature of its surface to be abraded by said lap; and means arranged to prevent any change in the direction of said axes during the abrading operation.

9. The combination with a rotary lap having an annular abrading surface with a central recess; of means arranged to variably limit the abrading effect of said annular surface, including a screw threaded member in said recess, adjustable longitudinally with respect to the axis of said lap; a longitudinally movable shaft carrying said lap; an adjustable collar on said shaft; a screw threaded stop device adjustable to variably limit the longitudinal movement of said shaft; and a gage plate coöperative with said screw threaded member and stop.

10. The combination with a rotary lap; of means arranged to variably limit the abrading effect of said lap, including a member axially adjustable in said lap; means carrying said lap, axially adjustable toward and away from the surface to be abraded; a stop adjustable to variably limit the axial movement of said lap; and a gage element coöperative with said member and stop.

11. The combination with an annular rotary lap having a central recess; of a rotary holder for the surface to be abraded; means arranged to relatively rotate said lap and holder; and means maintaining the axes of said lap and holder in such angular relation that said recess spans the axis of said holder, in eccentric relation therewith, with said axes intersecting at a center of curvature of said surface; whereby said lap is prevented from abrading the axial region of said surface while it is caused to abrade an annular region of said surface concentric with the axis of said surface but eccentric with the axis of said lap.

12. The combination with an annular rotary lap having a central recess; of a rotary holder for the surface to be abraded; means arranged to rotate said holder; and means maintaining the axes of said lap and holder in such angular relation that said recess spans the axis of said holder, in eccentric relation therewith, with said axes intersecting at a center of curvature of said surface to be abraded; whereby said lap is prevented from abrading the axial region of said surface while it is caused to abrade an annular region of said surface concentric with the axis of said surface but eccentric with the axis of said lap.

In testimony whereof, I have hereunto signed my name at Philadelphia, Pennsylvania, this sixteenth day of April, 1914.

HENRY A. SCHEUERLE.

Witnesses:
ARTHUR E. PAIGE,
ANNA ISRAELVITZ.